Nov. 11, 1958   D. A. REED, JR., ET AL   2,859,841
QUICK DISCONNECT STRUCTURAL FASTENER
Filed Jan. 3, 1956   2 Sheets-Sheet 1

INVENTORS.
DAVID A. REED, JR.
DONALD E. KEITH
BY
*William R. Lane*
ATTORNEY

Nov. 11, 1958     D. A. REED, JR., ET AL     2,859,841
QUICK DISCONNECT STRUCTURAL FASTENER

Filed Jan. 3, 1956     2 Sheets-Sheet 2

INVENTORS.
DAVID A. REED, JR.
DONALD E. KEITH
BY

*William R. Lane*

ATTORNEY

United States Patent Office 2,859,841
Patented Nov. 11, 1958

2,859,841

QUICK DISCONNECT STRUCTURAL FASTENER

David A. Reed, Jr., Anaheim, and Donald E. Keith, Fullerton, Calif., assignors to North American Aviation, Inc.

Application January 3, 1956, Serial No. 556,990

6 Claims. (Cl. 189—36)

The present invention is directed to a quick disconnect coupling arrangement for airframe attaching. More particularly, this invention concerns a quick disconnect coupling or fastener for attaching airframe structures, such as airplane or missile skins and spar and web members in wing members.

As used throughout the following specification and claims, the term "skin" is herein defined as the covering of an airframe or missile frame made up of a series of formed metal sheets.

Particular and severe problems have been encountered in making multiple bolt attachments of large airframe components. This problem has been particularly noted when it is necessary to preserve the exterior aerodynamic surface of the skin and to assemble the skins exteriorly of the configuration. Heretofore, the bolt assemblies which have been proposed for assembling panels in aircraft and missiles have included bolts situated inside the exterior surface of the skin panels connecting transverse bulk heads along the airframe. Generally, these bolt means are thus parallel to the major axis of the airframe and the longerons running substantially parallel to such axes. In order to provide for external adjustment of such parallel bolts, it has become necessary to provide bathtub-like fixtures indented in the skin panel surface in which the bolt head is recessed. Such fixture must be of such size so as to permit the insertion of tools to tighten the bolts and must also have a cover portion thereover to preserve a semblance of an aerodynamic smooth surface. When it is desired that the inner compartments be sealed much difficulty is experienced in attempting to line up structures with the close tolerance required. This leads to excessive mating time and greatly increases the chance of deforming the tapped holes and stripping the bolt threads.

The present invention solves the above difficulties by providing a clamping means operable externally of the skin panels and including specially constructed bolts and clamps for lining up juxtaposed airframe structures. The bolts are placed within tapped holes associated with the skin panels prior to the skin panels being placed in juxtaposition in contradistinction to the prior art in which the bolts are installed and torqued while the structures are in their juxtaposed position.

An object of this invention is to provide an improved attaching means for skin panels.

A further object of this invention is to provide an improved structural fastener.

A still further object of this invention is to provide a light-weight, flush mounted type structural fastener for skin panels.

An additional object of this invention is to provide an externally operable structural fastener for aircraft and missile skin panels.

Another object of this invention is to provide an improved means for structurally attaching longerons extending on the inside surface of skin panel structures.

The above objects of invention as well as other objects will become apparent from the following description, taken in connection with the accompanying drawings, in which Fig. 1 shows a partial cutaway of the over-all attaching means;

Figure 1:
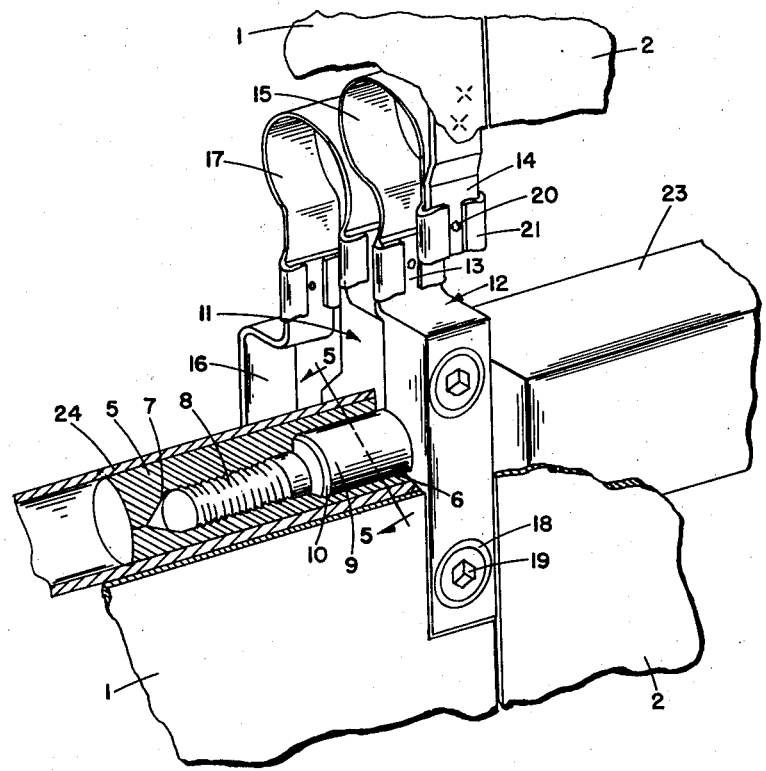
Figure 5:
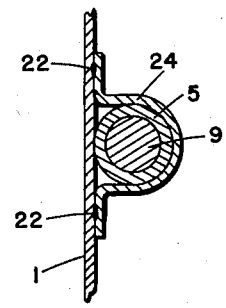

And Fig. 5 is a cross-sectional view taken on the lines 5—5 of Fig. 1.

Figure 2:
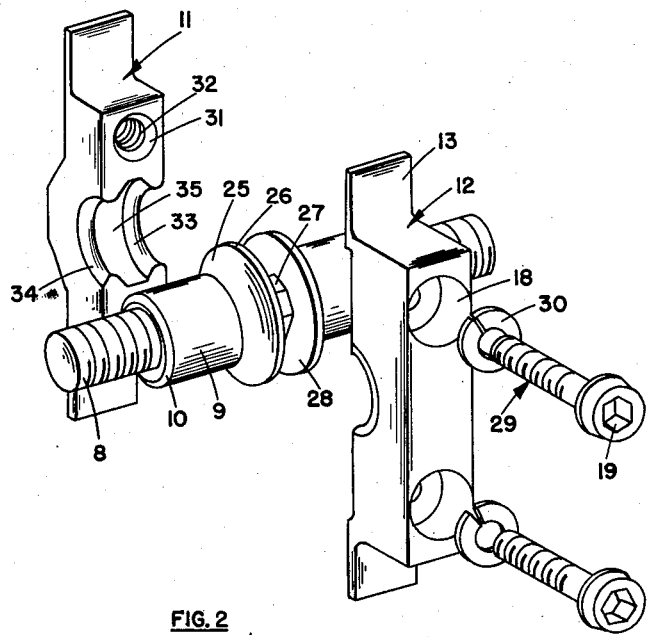
Fig. 2 is an exploded view of the structural fastener per se.

The illustration in Fig. 1 shows the improved means for attaching skin panels 1 and 2. A structural means, including a longitudinally extending airframe longeron 24 or other structural attaching block 23, is welded or otherwise joined to the sheets 1 and 2. A cylindrical tube 5 is preferably welded or otherwise attached inside the longeron 24. The cylindrical tube 5 contains a bore 7 and a larger counter-bore 6 extending inwardly from the end thereof. The bore 7 is tapped to receive a threaded shank 8 of a first attaching bolt which also has a smooth shank portion 9, of larger diameter than the threaded shank 8, seated within the counterbore 6. A bevelled surface 10 is provided on the bolt shank to provide the shank with optimum shear resisting capabilities. As can be seen with respect to the attached block 23, the counterbore may be formed directly in the attaching block without the necessity of providing a cylindrical tube 5 as seen within the longeron 24. The remaining portions of the attaching bolts may be seen in Fig. 2 and include a tapered head portion 25, a peripheral edge portion 26, and a flat bolt face 28 having a recess means 27 into which a tool may be inserted to torque the attaching bolts into the installed position. As seen in Fig. 1, a first clamp element 11 is provided extending at right angles to the attaching bolts on one side of the heads of such bolts. A second clamping element 12 is provided opposite the first clamp element with an exterior surface substantially flush with the skin panels. Bolt means 29 having their heads recessed in the exterior surface of the second clamping elements, extend at right angles to the attaching bolts and also at right angles to the clamping elements. Bolt means 29 contain recesses 19 for the insertion of a torquing tool. When the bolt means 29 and their associated washers 30 are passed through bores 18 and 31 and threaded into tapped holes 32 in the first clamping element 11, the juxtaposed attaching bolts are drawn up into tight engagement. The interior surfaces of the clamping elements 11 and 12 contain curved clamping ridges 33 and 34, separated by a clamping groove 35. This groove and the ridges cooperate with the tapered surfaces 25 and peripheral edge portions 26, respectively, of the attaching bolts to insure a tight seal of the attaching bolts and to provide a means for bringing slightly misaligned bolts into an aligned condition without stripping the threads from the attaching bolts or burring or deforming the tapped holes in the cylindrical tube 5 or attaching block 23.

Provision is made in Fig. 1 for conveniently holding the clamping blocks in position prior to the attaching bolts being drawn up by the torquing of the bolt means 29. Depending from the skin panel 1, for example, is a tab portion 14 while a similar tab 13 extends from the second clamping element 12. A spring loop 15 is detachably mounted between the tabs 13 and 14. To insure a firm fit of the spring loop and the tabs, bent over tab holding members 21 and associated detent portions 20 are provided. The first clamping element 11 is similarly provided with an upstanding tab and is connected by a similar spring loop 17 to a tab 16 attached to the longeron 24 or any adjacent structural member. The spring loops 15 and 17 serve not only to hold the clamping tabs in position prior to the bolt means 29 being threaded, but provide a small spring force to separate the clamping elements 11 and 12 during a disconnecting operation.

Figure 3:
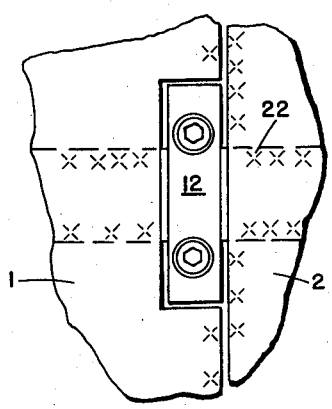
Fig. 3 shows an exterior plan view of a completed skin panel joint.

Fig. 3 shows a completed skin panel joint using the fastening means of this invention. Welds 22 are shown by which means the longerons and bulk heads are attached to the skin panels. An exterior configuration is thus achieved with minimum interference with the aerodynamic surface of the skin panels while allowing external connection and disconnection of adjoining pairs of panels.

Figure 4:
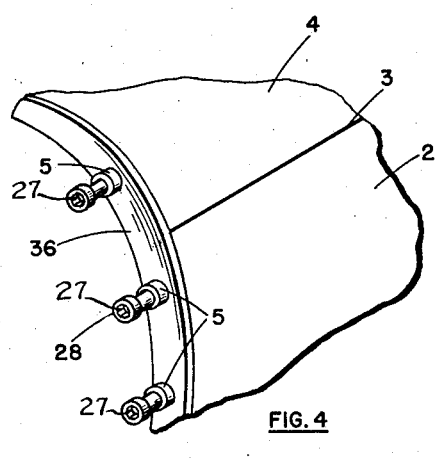
Fig. 4 is a fragmentary perspective view of an airframe structure prior to its being joined to an adjacent structure.

Fig. 4 illustrates a series of skin panels 2 and 4 making up a portion of an aircraft or missile fuselage. Such panels are normally seam welded together as at 3 and are welded to the outer surface of a peripheral bulkhead 36. The ends of the longitudinally extending longerons 24 shown in Fig. 5 are behind the peripheral bulk head 36 common to airframe structures with tapped tubes 5 extending therethrough. The attaching bolts of this invention are threaded into tapped holes within the longerons 24 prior to adjacent structural sections being brought into juxtaposition. When the assemblies are to be mated, the flat bolt faces 28 of the assembling bolts are placed in approximate juxtaposed position and are drawn up tightly by the exteriorly operated clamping means shown in Fig. 1.

Fig. 5 shows in detail a cross-section taken on the lines 5—5 of Fig. 1 including the tapped tube 5. A typically contoured longeron 24 is shown attached by welds 22 to sheet member 1.

The above described means for attaching skin panels gives advantages including ease of access, along with rapidity of connection and disconnection. The present clamping arrangement also serves to align misaligned structures and has a construction which is readily sealable and designed to withstand high loads in tension, compression and shear.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A structural fastener comprising first and second bolts each having a shank portion and an extending tapered head portion, said shank portions each being provided with a threaded portion adapted to be threaded into a structural member, the tapered head portions of said bolts being in opposed juxtaposed position, first and second detachable clamp elements extending at right angles to said bolts on either side of said head portions, clamping ridges on the juxtaposed internal surfaces of said clamp elements contacting said tapered head portions, and bolt means engaging said elements at right angles to said bolts and said elements clamping said elements and the juxtaposed head portions of said bolts into operative engagement.

2. In combination a pair of skin panels at a juxtaposed edge and each having a structural means attached thereto, a tapped bore in each of said structural means, first and second bolts each having a shank portion screwed into said tapped bores and an enlarged head portion extending in opposed juxtaposed position with the other, a first detachable clamp element extending at right angles to and on one side of said bolts, said clamp element being mounted on one of said structural means by a spring means which urges said clamp element away from said bolts, a second detachable clamp element extending at right angles to said bolts on the other side of said bolts and having an exterior surface substantially flush with said panels, said second clamp element being mounted on the other of said structural means by a spring means which urges said second clamp element away from said bolts, and bolt means engaging said clamp elements and extending from said exterior surface at right angles to said bolts and said elements releasably clamping said elements to said juxtaposed head portions and said skin panels.

3. The invention as claimed in claim 2 in which the structural means are longitudinally-extending longerons attached interiorly of the skin panels.

4. The invention as claimed in claim 2 in which said structural means includes a longeron longitudinally extending along portions of said skin panels and said tapped bore is within a cylindrical tube held interiorly of the longeron.

5. A structural fastener comprising first and second bolts each having a shank portion and extending tapered head portion, said shank portions each being provided with threaded portions adapted to be threaded into a structural member, said tapered head portions of said bolts being in opposed juxtaposed position, first and second detachable clamp elements extending at right angles to said bolts on either side of said head portions, spring means attached to each of said clamp elements and adapted to be secured to a structural member, said means normally urging said clamp elements apart a distance slightly greater than the diameters of said enlarged head portions, clamping ridges on the juxtaposed internal surfaces of said clamp elements contacting said tapered head portions, and bolt means engaging said clamp elements at right angles to said bolts and said elements releasably clamping said elements and juxtaposed head portions of said bolts in operative engagement.

6. The invention as claimed in claim 5, in which the clamp elements are provided with tabs at either end thereof, and said spring means are mounted on said tabs.

References Cited in the file of this patent

UNITED STATES PATENTS

| | | |
|---|---|---|
| 143,348 | Holmes | Sept. 30, 1873 |
| 2,142,388 | Wallace | Jan. 3, 1939 |

FOREIGN PATENTS

| | | |
|---|---|---|
| 229,396 | Great Britain | Feb. 23, 1925 |